DEVICE FOR THE TRANSFER OF INFORMATION BETWEEN MAGNETIC ELEMENTS

Filed Aug. 30, 1961 9 Sheets-Sheet 1

INVENTOR
SIMON MIDDELHOEK

BY [signature]
ATTORNEY

DEVICE FOR THE TRANSFER OF INFORMATION BETWEEN MAGNETIC ELEMENTS

DEVICE FOR THE TRANSFER OF INFORMATION BETWEEN MAGNETIC ELEMENTS
Filed Aug. 30, 1961 9 Sheets-Sheet 5
FIG. 12
| | 105 106 | 108 | | |
|---|---|---|---|---|
| a | 0 0 | 0 | 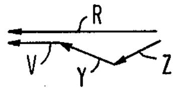 | 0 |
| b | 1 1 | 0 | 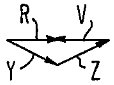 | 1 |
| c | 1 0 | 0 |  | 0 |
| d | 0 1 | 0 | 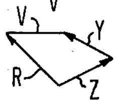 | 0 |
| e | 0 0 | 1 | 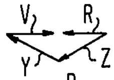 | 0 |
| f | 1 1 | 1 | 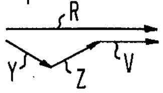 | 1 |
| g | 1 0 | 1 | 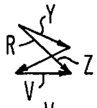 | 1 |
| h | 0 1 | 1 | 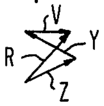 | 1 |

April 26, 1966 S. MIDDELHOEK 3,248,713

DEVICE FOR THE TRANSFER OF INFORMATION BETWEEN MAGNETIC ELEMENTS

Filed Aug. 30, 1961 9 Sheets-Sheet 6

United States Patent Office 3,248,713
Patented Apr. 26, 1966

3,248,713

DEVICE FOR THE TRANSFER OF INFORMATION BETWEEN MAGNETIC ELEMENTS

Simon Middelhoek, Kilchberg, Switzerland, assignor to International Business Machines Corporation, New York, N.Y., a corporation of New York Filed Aug. 30, 1961, Ser. No. 135,056
Claims priority, application Switzerland, Aug. 31, 1960, 9,821/60
7 Claims. (Cl. 340—174)

This invention relates to a device for the transfer of information between magnetic thin film elements and more particularly to transfer circuits in which asymmetric flow of information is achieved by constructing such devices so that the magnitude of magnetic field coupling varies, along each device, in the direction of information flow.

Heretofore information transfer circuits employing magnetic thin film elements which exhibit uniaxial anisotropy, defining opposite stable states of remanent flux orientation along an easy axis of magnetization, have required three such elements per binary bit with a three phase clock pulse system. The requirement of three such elements per binary bit with the three phase clock pulse system has been dictated by the need to insure unidirectional transfer of information. One such circuit is shown and claimed in a copending application, Serial No. 96,541, filed Mar. 17, 1961 and now U.S. Patent No. 3,113,297 in behalf of Wolfgang Dietrich which is assigned to the assignee of this application. In this copending application there is described a shift register requiring three magnetic thin film elements per binary bit. Each magnetic element is positioned in field coupling relationship to one another with their respective easy axes in alignment. Information stored in a first element is shifted to a second element by applying a field to rotate the magnetization of both a second and third element approximately 90° with respect to their easy axes. By rotating the magnetization of an element approximately 90° with respect to its easy axis, i.e., rotating the magnetization into the "hard" direction, only a small field is required to control the stable state to which the element will thereafter relax upon termination of the field applied thereto. In this case, the controlling field applied to the second element is obtained from the stray field of the first element coupling the second element. Since each of the elements are in field coupling relationship with respect to one another, it then becomes necessary to rotate the magnetization of the third element 90° with respect to its easy axis since, if its magnetization were not rotated, the fields applied by both the first and third elements to the second element could cancel, or, one might influence a greater effect over the other, and thus the final state assumed by the second element could not be unambiguously determined. Information is thereafter shifted from the second element to the third element by applying a field to the third element to rotate the magnetization thereof toward the hard direction so that the stray field coupling of the second element controls the final state assumed by the third element. During transfer of the information retained in the second element to the third element, the first element is not used to similarly register information retained in a preceding element since this final state assumed by the first element could not be unambiguously controlled. The ambiguity arises from the field applied to the first element by the stray field coupling of the second element. Therefore, after transfer of information from the first to the second element, the information is transferred from the second to the third element and thereafter information may be read into the first element by simultaneously rotating the magnetization of the second element into the hard direction to preclude any possibility of error. In such a circuit it is therefore necessary to apply a field which is transverse with respect to the easy axis of an element to each of two connective elements in sequence requiring three elements per bit and a three phase clock pulse system. The obvious disadvantage of such transfer circuits is the need for three elements per bit of binary information and a three phase clock pulse system.

The above disadvantages are overcome by constructing circuits in accordance with the teaching of this invention. According to this invention, transfer circuits may be constructed so that the magnitude of magnetic field coupling varies along each magnetic thin film element in a desired direction of information shift whereby an asymmetry is incorporated into each element allowing unidirectional information shift. This asymmetry is achieved by varying the shape of the element, by providing a varying distance between an element and a conductor used to produce a transverse field with respect to the easy axis of the element for information shift; or by providing an element made of a variable alloy composition. Generally an information transfer circuit according to this invention is constructed by providing a first, a second and a third magnetic element each of which have opposite stable states of remanent flux orientation along an easy axis of magnetization. Each magnetic element is switchable from one stable state to another upon application of a first field applied transverse and a second field applied parallel thereto with respect to the easy axis of the element. The elements are arranged in mutual field coupling relationship so that each element applies a parallel field with respect to the easy axis to each adjacent element. The circuit is provided with means, including the second element for applying both the first and second fields to both the first and third elements tending to shift the information stable state of the second element to both the first and third elements. This latter means, however, includes means by which the magnitude of one of the first and second fields varies in a desired direction of information shift whereby the state of the second element is only established in one of the first and third elements. Specifically, by varying the shape of the second element, such as a variation in height or width along the desired direction of information shift, the magnitude of the coupling field exerted by this element to adjacent elements is smallest at the smallest dimension varied and the greatest at the greatest of the dimension varied. Thus the parallel field applied by the second element to say the first element adjacent the smallest dimension of the second element is of little or no effect whereas the magnitude of the parallel field applied by the second element to third element is large thereby directing information shift to the third element. Instead of varying the shape of the element, a variation in the magnitude of the first field applied to both the first and third elements may be accomplished by so spacing a conductor used to apply this field that the magnitude decreases sequentially in the direction of desired information shift, as a clock pulse applied thereto terminates. Thus, while the magnitude of the first field is still a maximum in a portion of the first element adjacent the second element, the first field has started to decay in a portion of the third element adjacent the second element allowing unidirectional information shift.

Accordingly, it is a prime object of this invention to provide an improved magnetic information transfer circuit.

Another object of this invention is to provide an improved information transfer circuit employing magnetic elements arranged in field coupling relationship with respect to one another and a two phase clock pulse system.

Still another object of this invention is to provide an improved information transfer circuit using magnetic elements having an easy axis of magnetization wherein one of two orthogonal fields applied to the elements for switching their stable states varies in magnitude according to a desired direction of information transfer.

Yet another object of this invention is to provide an improved structure for planar magnetic elements in which a variation in the shape is used to incorporate asymmetry of information transfer.

The foregoing and other objects, features and advantages of the invention will be apparent from the following more particular description of preferred embodiments of the invention, as illustrated in the accompanying drawings.

In the drawings:

FIG. 12 is a tabular summary of the operations achievable with the device shown in FIG. 11.

FIG. 15 is a graphical representation for explaining the mechanism of the information transfer in the shift register of FIG. 13.

FIG. 16 shows a conductor for generating the controlling magnetic fields with the shift register similar to that shown in FIG. 13, wherein, however, the magnetic elements can have the same thickness and homogeneous composition at all points.

FIG. 1 shows a shift register, that is a unit consisting of several elements, which is capable of storing information, for example, the information "1" and "0" and of transferring it stepwise in the direction of the arrow 10 from one element to the following element.

Figure 1:
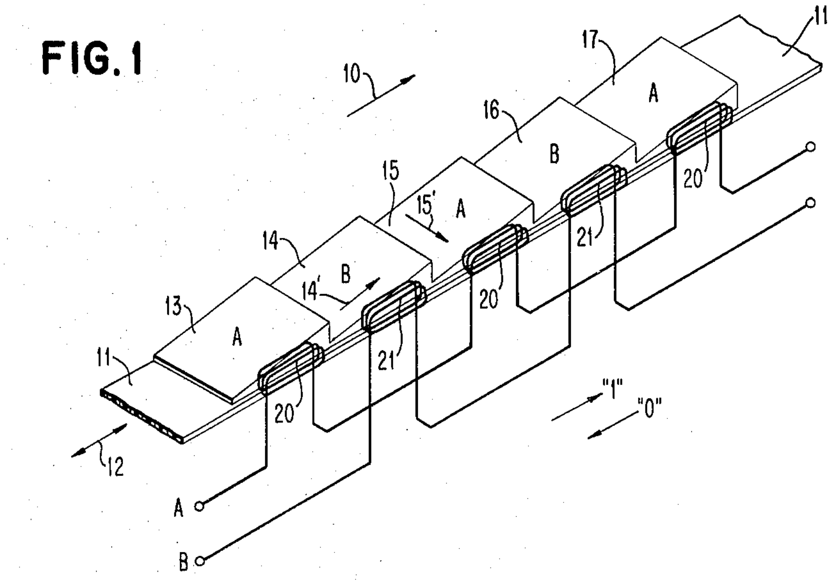
FIG. 1 shows a shift register consisting of wedge-shaped magnetic film elements, shown in perspective.

The device contains a substrate 11 of glass, for instance, upon which the individual elements 13, 14, 15, 16 and 17 are evaporated. The elements consist of an iron-nickel alloy. During the process of evaporation a magnetic field is applied in the direction of the double arrow 12, that is in the direction of shift, so that the elements receive a direction of easy magnetization. The elements thereby assume, preferably, a direction of magnetization in the direction of the arrow 12, which is referred to as the easy direction. If an external field is applied to an element, the field being perpendicular to the direction of arrow 12, this magnetization will be deflected from the direction 12, provided the field has adequate strength, to a direction which is perpendicular to 12. The magnetization remains deflected only as long as the external field is applied. If the external field is removed, the magnetization returns to the easy direction, that is in the direction of arrow 12. If external fields are not present at the instant the magnetization or the magnetization vector returns to the easy direction, this return process is undefined.

With the arrangement shown the individual elements are now located so close together that the stray field of one element influences the neighboring element so that the magnetization of the neighboring element assumes the direction which is determined by the one element when the magnetization returns.

For generating a field which magnetizes the element in the "hard" direction, two circuits A and B are provided which generate magnetic fields near the elements, with the means represented diagrammatically by a few turns, 20 and 21. The circuit A contains the turns 20, which are allocated to the elements 13, 15 and 17, while the circuit B forms the turns 21 which are allocated to the elements 14 and 16. Thus, with both circuits it is possible to magnetize alternately the odd numbered elements designated by A and the evenly numbered elements designated by B, in the hard direction.

It is now assumed that the magnetization of the individual elements in the direction of flow is allotted to the information content "1"; while the magnetization in the opposite direction represents the information "0," as illustrated in FIG. 1.

When, by way of example, the element 14 is magnetized in the direction corresponding to the information "1," and circuit A is disconnected, the magnetization vector 15′ returns to the easy direction 12, whereby the influence which is exerted by the magnetization of element 14 on element 15, determines that vector 15′ assumes the same direction as the vector 14′ of element 14.

It will thus be seen that by means of the circuits A and B the magnetization of the individual elements can be placed into an unstable position, whereby the stray field from the neighboring element determines the direction at the return from the unstable into the stable condition. Thus, in the example given, the information "1" was transferred from element 14 to element 15 at the instant when the element 15 returned from the unstable, hard magnetization, which was caused by the allocated winding 20 of circuit A, into the stable condition or easy direction.

It is seen that this system only conforms with the principle of two-clock operation when a field influencing the direction of return has a major influence from one element to the next only in the direction of information flow 10. Thus, for example, while the circuit A is switched-off the element 14 may mainly influence only the following element 15 in the direction of shift 10, but not, however, the element 13 adjoining in the opposed direction. The stray field influence which element 14 exerts on element 13 must be at least sufficiently smaller than the influence with which the element (not represented) on the left of element 13 influences this element 13. At any one time it is only permissible for an element to exert a major influence on the element succeeding it at the time of its return to the stable, easy direction.

In order to fulfill this requirement the individual elements may be formed asymmetrically. In the example shown the individual elements are wedge-shaped, whereby the cross-section increases in the direction of information shift 10. This ensures that the stray-field influence is greater on the element on the side of the thicker edge than the stray influence is on the element which borders on the narrow edge.

Figure 2:
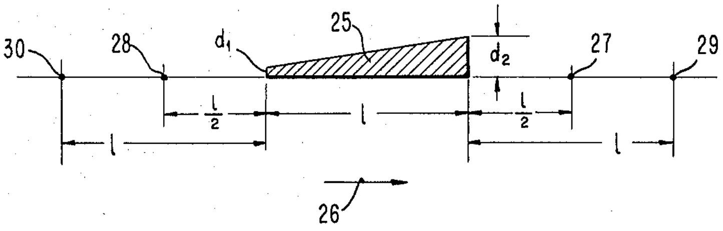
FIG. 2 shows a cross-section through a magnetic unit of the shift register shown in FIG. 1.

FIG. 2 is a cross-section of an individual element.

It is seen that the element 25 increases in thickness in the direction 26, that is in the direction of information flow. The thickness $d_2$ at the right-hand end of element 25 should be greater in the order of 10 than the thickness $d_1$ at the left edge of the element 25. The total length of the element is 1. In the first approximation, the stray fields in the region of the edges are proportional to the thicknesses $d_1$ and $d_2$. If, for example, the points 27 and 28 are considered, which are located approximately a distance ½ from the front edge and the back edge the magnetostatic field at point 27 is ten times greater than the corresponding field at point 28. Preferably, the length of element 25 is selected so that the field strength of the field generated by element 25 at point 29, which is located a distance 1 ahead of the front edge of element 25, is still greater than the field strength at point 30, insofar as it emanates from the back edge of element 25. In order to ensure a correct information transfer in every case, the field strength of the field leaving the leading edge of element 25, should be greater by the factor 2 at point 29 than is the field strength of the field leaving the back edge of the element, at point 30.

In the example shown, the elements for ensuring a transfer of information in one direction are wedge-shaped. There are, however, additional possibilities for achieving the same effect. So, for example, the composition of the layer material of each element can be selected so that the ferro-magnetic proportion at the edge of the element via which the information is transferred, is greater than at the opposite edge. In this case the saturation field strength in the hard direction increases continuously in the direction of information shift.

Another possibility for ensuring that the information is transferred only in the desired direction consists in selecting the geometry of the conductors which produce the controlling magnetic fields, that is which produce a magnetization in the hard direction, so that with a given current I the field strength acting on the individual elements, increases in the direction of information shift. Such an embodiment may be explained later and in more detail.

A further example of a layer which has, in the direction of information flow, an increasing hard direction saturation field strength is obtained by evaporating on a substrate the magnetic material at an angle which differs by 90°. In this case the maximum saturation field strength is at the point located furthest from the source of evaporation.

Figure 3:
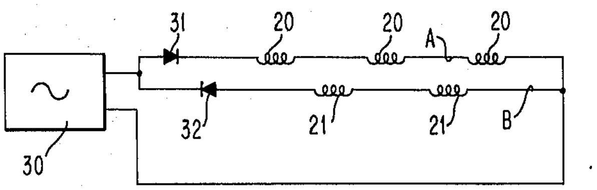
FIG. 3 is the circuit diagram of a device for generating the currents which are necessary for producing the controlling magnetic fields for the device shown in FIG. 1.

FIG. 3 shows the circuit diagram of a device for generating the voltages which produce the controlling magnetic fields, which cause the magnetization in the hard direction. An A.C. generator 30, is provided for generating the voltage; the two circuits A and B are each connected via rectifier 31 and 32 to the generator 30. In this arrangement the rectifiers have opposite polarity. In a first half-wave for example the rectifier 31 is conducting, so that circuit A conducts current and urges the magnetization in the allotted elements into the hard direction. Hereby, the current strength must be selected so that at least at the peak current value saturation in the hard direction is achieved. During the succeeding second half-wave circuit B conducts current, while circuit A carries no current at this time. At the instant when the current in circuit B decreases below the saturation field strength in the hard direction, the elements which are allotted to circuit A influence the elements allotted to circuit B, in the direction of information shift, so that the elements of circuit B are magnetized in the same direction and take over the desired information. It will thus be seen that for the transfer of information from an element belonging to circuit A to the next element in the direction of information flow, belonging to circuit A, a full period of generator 30 is necessary.

Figure 4:
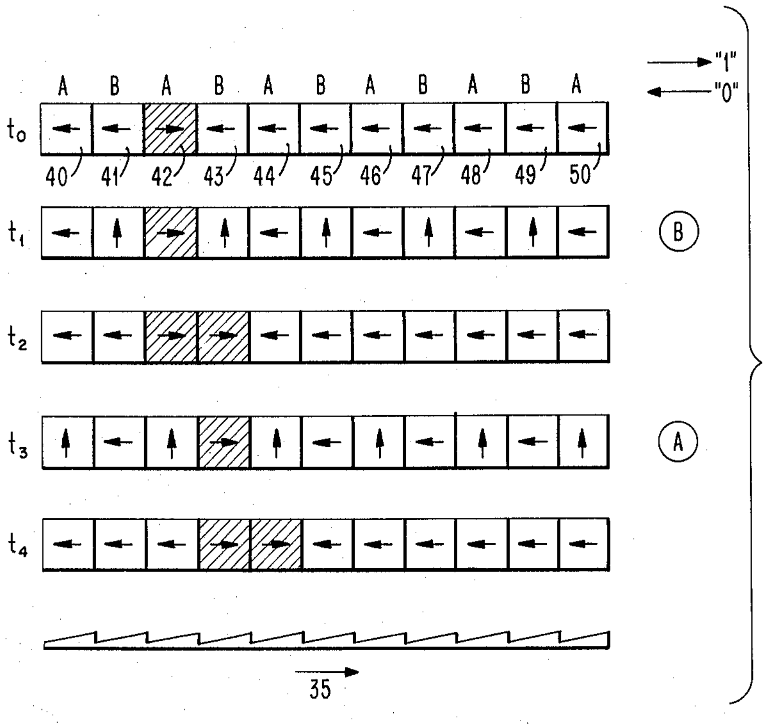
FIG. 4 is a graphical representation for explaining the mechanism of the transfer of information in the shift register shown in FIG. 1.

The mechanism for the transfer of information will now be explained again in detail with the aid of FIG. 4. It is assumed that a magnetization of an element in the direction of information shift corresponds to the information "1" and a magnetization in the opposite direction corresponds to the information "0," as this is indicated in the figure. Arrow 35 indicates the direction in which the information flows in the representation, that is from left to right. FIG. 4 shows diagrammatically a series of magnetic film elements 40–50 at various instants $t_0$–$t_4$.

It is further assumed that at the beginning of the first half-wave of generator 30, that is at instant $t_0$, element 42 stores the information "1," while all the other elements represented store the information "0."

At the instant $t_1$ circuit B has attained maximum current, so that all the elements allocated to this circuit B are magnetized in the hard direction. If now, the current in circuit B decreases below the value necessary for the generation of saturation in the hard direction, the magnetization vectors endeavor to return to the easy direction of magnetization. Element 41 is now under the influence of element 40, so that it returns to the "0" position. Resulting from the wedge-shape of the individual elements, element 41 is influenced far more by the element 40 than by the element 42, which stores information opposite to that of element 40. On the other hand, element 43 is influenced mainly by element 42, so that element 43 is adjusted in a manner which corresponds to the information "1." At the instant $t_2$, that is when the current in circuit B has dropped to zero, the magnetization in elements 42 and 43 corresponds to the information "1," while all the remaining elements represented have fallen back to that easy direction of magnetization which corresponds to the information "0." During the second half-wave circuit A now conducts current, so that the elements allotted to this circuit are magnetized into the hard direction. At the instant $t_3$ saturation field strength in the hard direction is attained. At the succeeding drop in current in circuit A, element 42 assumes a position in the zero direction as result of the influence emanating from element 41, while as a result of the stray field effect emanating from element 43, element 44 assumes a position in the "1" direction. Thus at instant $t_4$ only the elements 43 and 44 are magnetized in the "1" direction, while the elements 40–42 and 45–50 are set in the zero direction.

It will thus be seen, that during a full period the information "1" has passed from element 42 to element 44, that is to the following element allotted to circuit A. It is of no consequence that at the instant $t_4$ the element of circuit B stores the information "1," since with the following increase in current in circuit B, this information is cancelled, whereby this element 43 accepts the information of element 42, "0" in the present case.

The arrangement shown in FIG. 1 is intended primarily to illustrate the principle of the set-up; in practice the conductors for magnetizing the elements can be formed in a manner far simpler than that shown in FIG. 1. With the aid of FIGS. 5 and 6 there are shown two examples of practical embodiments of the conductors A and B.

Figure 5:
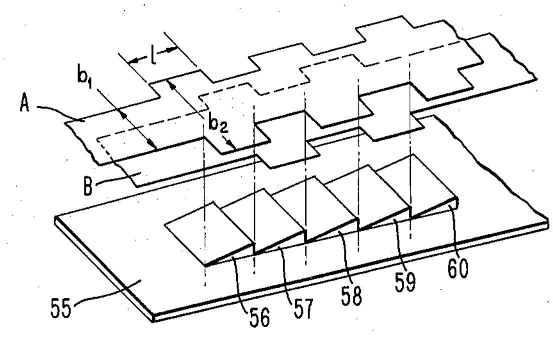
FIG. 5 is a shift register corresponding to FIG. 1 with flat conductors for the generation of the controlling magnetic fields.

In the example shown in FIG. 5 the elements 56–60, formed as magnetic layers, are evaporated onto a substrate 55 of glass or some other material which has no, or virtually no, magnetic properties. Two conductors A and B are provided for generating the deflecting fields. The conductors are of copper (for example) and, insulated with respect to each other, are located immediately above the elements 56–60; that they are shown somewhat higher, is merely for the sake of clarity.

The width of the conductors A and B varies symmetrically between two values $b_1$ and $b_2$, the length $l$ between two consecutive changes in width is equal to the length of the individual elements in the direction of information shift. The two conductors are arranged so that they are displaced with respect to each other and so that a narrow section having the width $b_1$, of the upper conductor A in the figure, is located above a wide section having the width $b_2$, of conductor B, and a wide part of width $b_2$ of the upper conductor A is located above a narrow part of conductor B. Furthermore, the two conductors are arranged so that the boundary lines of the changes in width coincide with the boundary lines between the elements.

The illustration shows that a wide part of conductor B and a narrow part of conductor A are located above element 57. It will also be seen without difficulty that the magnetic field generated by conductor B exerts less influence on element 57 that the magnetic field produced by conductor A. The reason for this is that the current density and thus also the flux density of the generated magnetic field which is exerted on element 57 by conductor A, is greater than the current density of conductor B at the location of element 57, so that only a small portion of the magnetic field generated by conductor B has an effect on element 57.

The width $b_1$ is approximately the same or slightly more than the width of the magnetic elements, whereas the width $b_2$ considerably exceeds the width of the elements. More in detail, the width $b_2$ must be selected so that the magnetic field created by the wide parts is definitely not sufficient to magnetize the elements to saturation in the hard direction, since under these circumstances the information content of these elements is also maintained when a limited deflection of the magnetization vector takes place into the hard direction.

With the arrangement shown in FIG. 5 it is thus possible to transfer information according to the two-step system. The two conductors A and B can be manufactured easily. Moreover, the arrangement requires very little height; this is a definite advantage.

Figure 6:
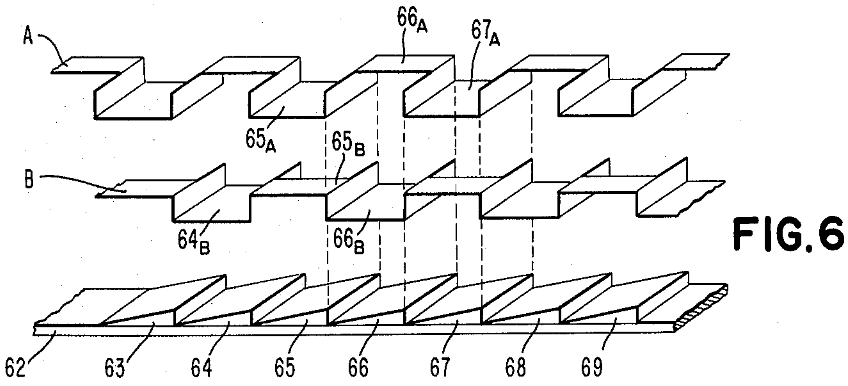
FIG. 6 is a shift register corresponding to FIG. 1 with conductors of a different shape than those in FIG. 5 for the generation of the controlling fields.

FIG. 6 shows a further example. Again, wedge-shaped magnetic units 63–69 are arranged on a substrate 62. Again, as in the previous examples, two conductors designated by A and B are provided, which at any given time saturate every second magnetic unit in the hard direction of magnetization when they conduct current.

In the example shown in FIG. 6 the conductors consist of U-shaped conductor sections $64_B$, $65_A$, $66_B$ and $67_A$, and so on. The individual U-shaped conductor sections are joined together by strip-like conductor components $65_B$, $66_A$, etc. The arrangement is such, that between the U-shaped components of a conductor there are received the U-shaped components of the other conductor. By way of an example the U-shaped conductor component $66_B$ is located above the element 66; above the succeeding element 67 is located the conductor element $67_A$, etc. It can easily be seen from the drawing that in each case the strip-shaped connecting components $65_B$, $66_A$, etc., bridge a U-shaped conductor component $65_A$ or $66_B$. The strip-shaped connecting components of the two conductors A and B must therefore be displaced with respect to each other.

If now conductor B carries current, the elements 64, 66 and 68 are magnetized into the hard direction of magnetization, that is they are converted to an unstable condition. Hereby, the magnetic flux emanating from the connecting components is inadequate, owing to the greater distance from the magnetic elements 63, 65, 67 and 69, noticeably to magnetize these elements in the hard direction. If, on the other hand, conductor A carries current, the elements 63, 65, 67 and 69 are magnetized in the hard direction, while the elements located in between, having the even reference numbers, are virtually uninfluenced. It will thus be seen that the arrangement shown in FIG. 6 is capable of operating in the same way as was explained previously in connection with FIG. 4.

Figure 7:
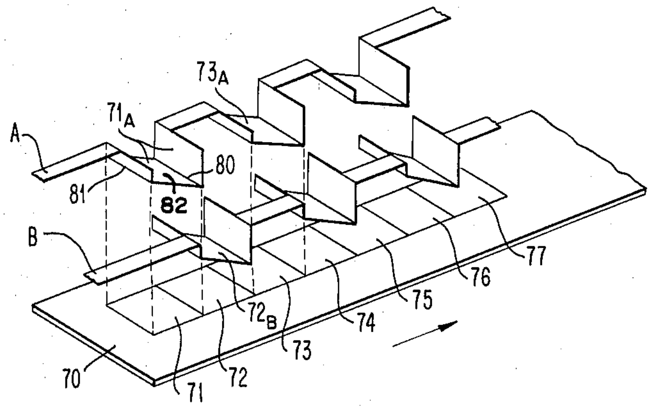
FIG. 7 is a shift register with homogeneous magnetic elements and conductors inclined in places, for obtaining the asymmetry.

It has already been explained that it is not necessary for the magnetic elements to be wedge-shaped. On the contrary, the elements can be made with equal thickness at all points, if the magnetic characteristics increase in the direction of information flow, preferably continuously. In addition, however, it is also possible to make the elements of a homogeneous material and with constant thickness, if an asymmetrical performance is brought about in a different way and which assures that the information can only be transferred in the desired direction. FIG. 7 shows an example of this.

Magnetic elements 71–77 are evaporated on a substrate 70. As already explained the magnetic elements are of equal thickness on all sides and all points have the same material composition, that is the same magnetic characteristics.

The conductors A and B are constructed in a similar manner as the conductors A and B of the example associated with FIG. 6. The U-shaped conductor components $71_A$, $72_B$, $73_A$, etc. are, however, trapezoidally arranged in cross-section, that is the foremost edges in the direction of information flow are closer to the magnetic elements than the rear edges. Thus, for example, edge 80 of conductor component $71_A$ is closer to the magnetic element 71 than the edge 81 of this component. Between these two edges there is the intermediate piece 82, which preferably is flat and sloped with respect to the plane of the magnetic elements so that the distance between the two decreases in the direction of information shift.

The arrangement shown in FIG. 7 operates in essentially the same manner as the arrangements corresponding to FIGS. 1, 5 and 6. It is assumed, for the purpose of explanation, that the conductors A and B are connected, as shown in FIG. 3 and that the flow of current through conductor B has reached its maximum. At this instant the whole magnetic element 72 is magnetized in the hard direction. Thus, with given maximum current intensity a saturation in the hard direction must also be achieved at that point which is located furthest from the associated conductor component $72_B$, that is at the rear edge of element 72 with respect to the direction of information shift. If now the flow of current through conductor B decreases, the rear part of magnetic element 72 first discontinues to be in the region of saturation, while the foremost part, seen in the direction of shift, still remains saturated on account of the shorter distance from the associated conductor component $72_B$. When the rear part is no longer saturated in the hard direction, it already starts to return into the easy direction of magnetization, whereby the direction of magnetization of element 71 is decisive for the direction of return. With progressive reduction of the current in conductor B the sections situated in the foremost regions in the direction of information flow start losing their saturation, but nevertheless remain under the influence of the magnetic element 71 and under the influence of the regions of element 72, which have already adapted themselves in accordance with the stray field which emanates from element 71. When the current in conductor B has decreased to zero, the magnetization of element 72 has already adjusted itself completely corresponding to the stray field emanating from element 71. Since the foremost edge of element 72, i.e., that edge which borders on element 73 was saturated for the greatest period of time, there is no possibility of element 72 to adapt itself to correspond to the stray field emanating from element 73. It will thus be seen, also in the case of the example associated with FIG. 7, that the direction of information shift is established as a result of the special conductor formation and in the manner explained with reference to FIG. 4.

Figure 8:
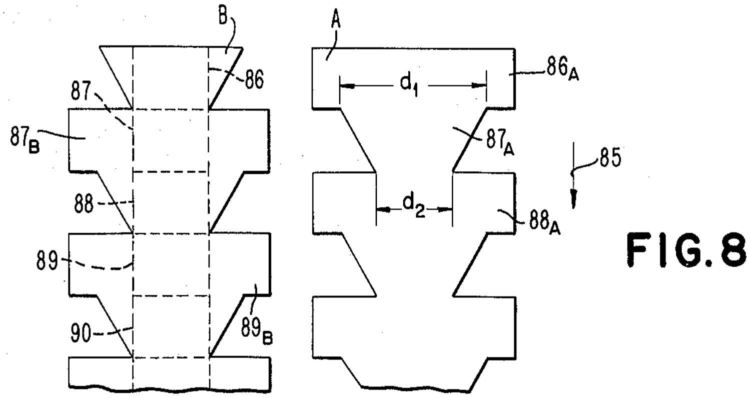
FIG. 8 shows flat conductors for the generation of the controlling magnetic fields, which can be employed in combination with magnetic elements of constant thickness.

The principle of information transfer explained with the help of FIG. 7 can also be achieved by means of flat conductors A and B. FIG. 8 shows two flat conductors A and B in top view, situated next to each other, wherein the magnetic elements 86–90 are indicated under conductor B. As arrow 85 illustrates, the information here moves downward in the plane of the drawing. As in the case of the example of FIG. 7, the five magnetic elements 86–90 are equally thick at all points and have the same composition. Similar to the example of FIG. 5 the conductors have relatively wide sections $86_A$, $87_B$, $88_A$, $89_B$, etc., which, on account of the low current density and the large surfaces, over which the magnetic lines of force are distributed, do not exert any, or hardly any, influence on the associated magnetic elements. The narrower conductor section situated between two wider sections, for instance section $87_A$, becomes narrower in the direction of information shift. By way of example, the width of the narrow element reduces in the direction of information shift from a value $d_1$ to a value $d_2$. The field at the location of width $d_1$, which is exerted on the associated magnetic element, for instance element 87, is thus always smaller than the field which influences the element at the location of width $d_2$. However, the width $d_1$, at a given maximum current, must always be dimensioned so that all parts of an element are saturated in the hard direction of magnetization. If now the current in conductor A decreases, that part of element 87 will no more be subject to a saturation field, which is located at the line of the width $d_1$, that is that part located at the rear edge of the element in the direction of information shift. This part, however, is under the influence of the stray field emanating from element 86, so that this stray field establishes the direction of magnetization of element 87 even before the current of conductor A has fully decreased to zero. In the same way as has been described in connection with FIG. 7, the next element in the direction of information shift, that is in the assumed case the element 88, has no possibility of influencing element 87, since the edge allotted to the width $d_2$ of the conductor A remains longest saturated in the hard direction of magnetization.

The example of FIG. 8, like the other examples, thus operates according to the two-step process and is distinguished by being physically of very small height as well as by the fact that the individual elements can be manufactured easily to be homogeneous as to thickness and composition.

The transfer of information has so far always been explained with the aid of shift registers as examples. It is now desired to point out that the described principle of information transfer also lends itself for the accomplishment of logical operations.

Figure 9:
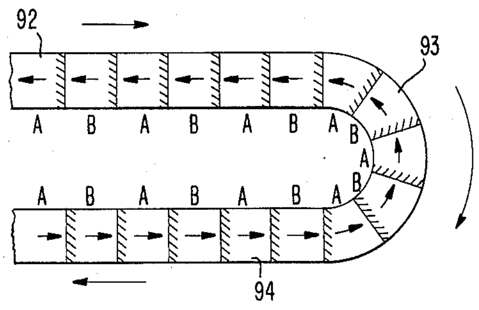
FIG. 9 shows an inverter with simultaneous reversal of the direction of information, employing a shift register according to FIG. 1.

FIG. 9 shows a simple arrangement by means of which an operation can be accomplished. Since, by way of an example, a magnetization vector oriented to the right represents a binary "1" and a magnetization vector oriented to the left represents a binary "0," it is possible to achieve a reversal by forming a loop. FIG. 9 shows such an arrangement. An upper branch 92 of magnetic elements is connected via a 180° bridging loop 93 with a lower branch 94. The individual elements are wedge-shaped, in the manner described with the aid of FIG. 1. The thicker edge is indicated by shading. In the manner similar to that described with the help of FIG. 1 or FIG. 5, conductors A and B (not shown) are arranged, which are capable of magnetizing in the hard direction the allotted elements A and B. The easy direction is characterized by the arrow shown in every element; the conductors A and B must be arranged so that the magnetization which they produce in every element is directed perpendicularly to the arrows as shown therein. In the upper branch 92 the arrows point to the left, and in the lower branch, to the right, which shows that an inversion takes place. This inversion, however, is associated with a reversal of the sequence. If, for instance, the signal sequence 1010011 is given on branch 92, the signal sequence 0101100 appears in the lower branch 94.

Figure 10:
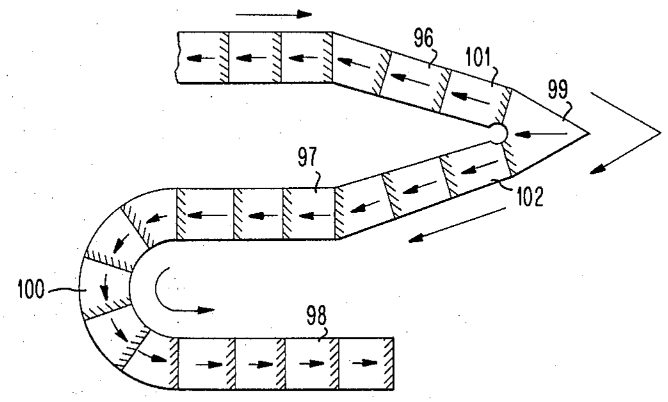
FIG. 10 shows an inverter with which the original direction of shift or sequence is restored.

In order also to reverse the sequence, it is necessary to extend the arrangement by the addition of a device for reversing the direction, as shown in connection with FIG. 10. With the FIG. 10 arrangement, three branches 96, 97 and 98 are provided. The branches 96 and 97 are joined by an element 99, while the branches 97 and 98 are joined together by a loop 100, which corresponds to the loop 93 of the FIG. 9 arrangement. The element 99 receives the information arriving from the branch 96 via an element 101 and takes over a magnetization which corresponds to the magnetization of element 101. The element 99 passes on the information to element 102, which is practically parallel to element 101. Thus element 99 performs a reversal of direction, without changing the value, that is the information. When, for example, the signal sequence 1010011 assumed above is transferred via branch 96, the information 1010011 appears on the branch 97. As explained in connection with FIG. 9, at the transfer from branch 97 to branch 98 a change of direction with inversion takes place, so that the information sequence 0101100 appears on branch 98, which is the inversion of the supplied signal sequence 1010011, wherein the direction of information shift is again the same. Thus, as will be immediately recognized, it is possible to accomplish an inversion with the extremely simple means illustrated in FIG. 10.

Figure 11:
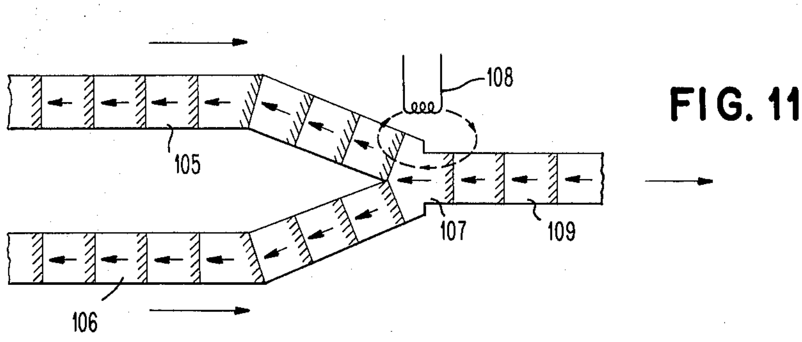
FIG. 11 is a device for the accomplishment of logical operations employing the magnetic film elements shown, by way of example, in FIG. 1.

The elements described, which operate according to the two-clock principle, can, however, also accomplish logical operation, as this will now be explained with reference to FIGS. 11 and 12. For the FIG. 11 arrangement two branches 105 and 106 are provided, through which the information passes in the direction of the arrows, that is from left to right. The two branches affect commonly the element 107, to which another branch 109 is joined, in the direction of information shift. Exactly as in the previous examples, conductors A and B (not shown) are arranged which as just explained, control the transfer of information. A "mixture" now takes place of the information arriving via the branches 105 and 106. With this process of mixing, the stray fields of the last elements belonging to the branches 105 and 106, influence element 107, so that the vector on element 107, representing the sum of the vectors of the two influencing stray fields, is decisive for the setting of this element. It will be realized at once that this resultant vector does not always possess a component in the easy direction. Additional means must therefore be provided, capable of creating an additional field having a component in the easy direction. In the arrangement of the FIG. 11 these means take the form for example, of a coil 108, located sidewise; its field influences element 107. Mention is made of the fact that the additional field can also be generated by other means, for instance a further element adjacent to element 107.

With reference to FIG. 12 the possibilities of mixing input signals may now be discussed. In the first column of the table of FIG. 12, the binary values "0" and "1" are given as input values, whereby the first number is allotted to branch 105 and the second to branch 106. Numbers are also indicated for the additional field produced by the coil 108 (second column); it is desired to be stated, that the fields caused by the coil 108 approximate in strength substantially to those fields produced by the elements adjacent on the left of element 107, when the information "1" or "0" is to be transmitted to the element 107. The third column shows the addition of the three field vectors influencing the element 107, that is the vectors of the field of the branch 105 and the field of the branch 106, and also the vector of the additional winding. The resultant field strength, which acts upon the element 107, is designated by R, the field of the additional winding is designated by V, the field of the branch 105 by Y and the field of the branch 106 by Z. The result of the logical operation is shown in the fourth column; it will be seen at once, whether the resultant field vector R has a component in the "1" or the "0" direction.

The means 108 for generating an additional field, determines how element 107 is influenced when via one of the branches 105, 106, the signal "0" or "1" and via the other branch, the signal "0" or "1" is transferred to element 107. The possibilities occurring in the various cases are indicated in the lines *a–h*.

The angle at which the two branches 105 and 106 converge on element 107 must be such that the sum of the two fields from the elements bordering to the left of element 107 is always greater, in the case of identical signals, than the additional field originating from the winding 108. By the above the input signals 1, 1 and 0, 0 always must lead to the result "1" and "0," regardless of the direction of the applied additional field.

It will thus be seen that, depending on the direction of the additional field, the element 107 operates as an "and" or an "or" element and is capable of accomplishing corresponding logical operations. The combinations given in the rows *a–d* represent the "and" operation and those given in the rows *e–h*, the "or" operations.

For the sake of completeness, it is mentioned that the information can be applied to and again read from a series of magnetic units by means of simple coils, whereby the direction of the current applied to the coils, or the current derived from these coils is an indication for the prevailing information. In addition to the shown arrangements for the accomplishment of logical operations, there are obviously other possibilities. As already mentioned, by way of example, it is possible for three input elements to influence a single element.

The devices described so far, comprising magnetic elements, operate in accordance with the two-clock system, that is two conductors are provided, which are alternately excited and thereby control the transfer of information from one unit to the next. By employing magnetic units whose characteristics vary in the direction of information shift, however, it is also possible to produce devices which can be controlled via a single electrical conductor. FIGS. 13 to 16 will be used to explain such an arrangement.

Figure 13:
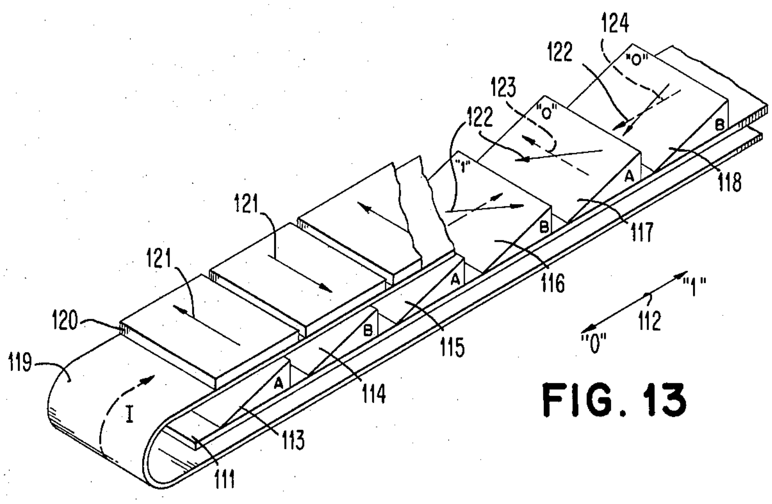
FIG. 13 shows a shift register with wedge-shaped magetic elements and a single conductor for controlling the transfer of information, shown in perspective.

In the example shown in FIG. 13, a glass substrate 111 is arranged, onto which the magnetic units 113–118 are evaporated. During the process of evaporation a field was applied in the direction of the arrow 112, so that each element has a direction of easy magnetization, that is an "easy" direction, which coincides with the direction of information shift. Like in the previous arrangements, the individual magnetic elements are wedge-shaped, whereby the thickness of the element increases in the direction of information shift, so that the magnetic stray flux of one element and influencing the following element in the direction of information shift is greater than that influencing the element bordering on the side opposed to the direction of shift. Thus, analogously, the conditions explained with reference to FIG. 2 are applicable.

The substrate 111 is surrounded, for example, by a copper conductor 119 which forms a loop and thereby also extends over the element. Permanent magnets 120 are attached to that part of the conductor 119 above the elements, whereby a permanent magnet is allotted to each of the elements 113 to 118. The elements 113 to 118 may be considered to be divided into two groups A and B, which follow each other alternately.

The magnets 120, which are allotted to the elements of the A group and the magnets 120 which are allotted to the elements of the B group are of opposed polarity, as indicated by the arrows 121 and endeavor to magnetize the associated elements in the hard direction of magnetization.

Figure 14:
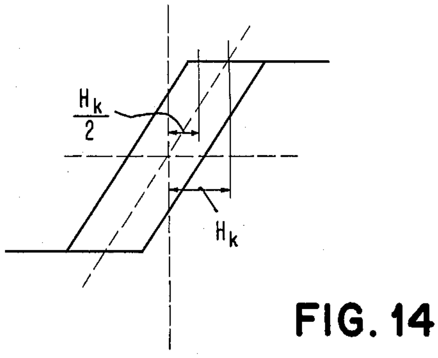
FIG. 14 shows the hysteresis loop of the materials of the elements of the shift register of FIG. 13.

FIG. 14 shows diagrammatically the hysteresis loop of the layer material of which the elements 113 to 118 consist. The saturation field strength in the hard direction is $H_K$. Magnets 120 are now proportioned so that the magnetic field which they produce at the location of the elements 113 to 118 corresponds at least approximately to half the magnetic saturation field strength. The magnetization vectors of the magnetic layers are thus deflected out of the easy direction of magnetization by about $\pm 30°$, as the arrows 122 show. A component of the magnetization vectors 122 in the direction of information shift corresponds to the binary information "1" and a component in the opposite direction, to the binary information "0." Thus in the example represented the elements 117 and 118 are set to the binary value "0," the element 116 to the binary value "1."

In order to explain the mode of operation, it is assumed that through conductor 119 there flows a sine wave current for example, whose maximum value is such that the magnetic field it produces and which influences the elements, has a value corresponding to $\pm\frac{1}{2}\ H_K$. It is further assumed that the field of the first half wave is oriented so that the fields of those magnets 120 which are allotted to the B elements are neutralized, while there is superposed to the fields of the magnets which are allotted to the A elements an equally large field in additive relationship. Thus elements B are no longer influenced by a field, so that they adjust themselves in the easy direction of magnetization and continue to store the information "1" or "0." The A elements, however, are saturated in the hard direction. The conditions which prevail are illustrated by the dotted arrows 123 and 124. If now the current through conductor 119 decreases, the vector B elements incline, since the fields emanating from the allotted permanent magnets now start to be active again. Simultaneously, the vectors of the A elements deviate away from the hard direction of magnetization, as a result of the weakening of the field which influences them. If the A elements were not influenced by an external field in the easy direction or the direction of information shift when the current through conductor 119 decreases, the magnetization, which adjusts itself to the easy direction, would be left to chance. However, under the influence of the elements B, located to the left, the A elements are influenced to adjust themselves in the direction dictated by the left-hand neighboring B elements. As with the previous arrangements, a reverse flow of information is not possible. Moreover, it will be seen that the information is moved along one element per half wave, so that one full period of the current I results in the information being transferred two units further along, that is from one element A to the next element A.

The procedure which takes place when information is transferred is explained once more, with reference to FIG. 15. The first line, which corresponds to the instant $t_0$, gives the directions of magnetization under the influence of the permanent magnets. With the exception of element 130, all the elements are oriented to correspond to the information "0." At the instant $t_1$ the current flowing through conductor 119 is at its maximum value, that is it generates a field of $+\frac{1}{2}\ H_K$. The field influencing elements A in the hard direction corresponds to saturation, so that the magnetization vectors adjust themselves into the hard direction. In the case of the B elements, the influencing fields are neutralized, so that having regard to the stored information "1" or "0" the magnetization vectors adjust themselves in the easy direction.

With the succeeding decrease of the current, the magnetization of the A elements returns from the hard direction of magnetization, whereby the direction of rotation is influenced by the stray field of the neighboring element on the left-hand side. The magnetization vector of element 131 turns in an anti-clockwise direction as a result of the influence from element 130, and takes over the "1" information, while under the influence of element 133, which is storing the "0" value, the vector of element 132 turns clockwise and takes over the "0" information. At the instant $t_2$, that is after a half wave of current I, the information has thus advanced a step, that is it is one element further. During the following half wave, the direction of current I reverses, so that the field produced by this current has a field strength of $-\frac{1}{2} H_K$ at maximum value. Accordingly, an external field no longer influences the A elements in the hard direction, while the B elements are saturated in the hard direction. At the next decrease of the current I, the elements A influence the neighboring B elements, so that for example the information "1" passes from element 131 to the neighboring right-hand element 134. At the instant $t_4$, that is after a full period of current I, the information "1" has passed from element 130 to the succeeding element B, that is to the element 134.

In the last line of FIG. 15 the elements are shown once again, in cross-section, so that it can be seen that owing to the varying thickness of the elements, the neighboring elements can only be influenced by stray fields in the direction of information shift, that is in the direction of the arrow 136.

For the explanation of this example it was assumed that the magnetic elements were wedge-shaped. In this case, too, obviously, it would be possible to make the elements equally thick at all points, if the proportion of ferro-magnetic material increases in the direction of information shift. Such elements then behave like wedge-shaped elements.

It is nevertheless also possible to make the elements equally thick and homogeneous when the conductor is formed so that the information can only pass in the planned direction. Such a conductor is illustrated in FIG. 16 and designated by reference numeral 140. The direction of information shift is indicated by the arrow 141.

The field leaving the permanent magnets in the example under discussion can obviously also be produced by two conductors through which current flows in opposed directions. The conductors (not shown) carrying the D.C. current can be arranged so that the same field distribution is achieved as with permanent magnets 142 (FIG. 16).

The example of the invention which is described with reference to FIGS. 13–16, enables the $H_K$ values to vary somewhat from element to element. If a film element has a saturation field strength which deviates a little, the result is that the magnetization in the element is not aligned exactly in the easy direction when the neighboring element is saturated. If the deviation is not too great the stray field of the neighboring element is still adequate for transferring the information.

The principle of information transfer which is described by means of the FIGS. 13–16 obviously also enables logical operations to be accomplished, that is, in the manner described in connection with FIGS. 9–12.

In connection with FIGS. 17–21 there may now be explained a further arrangement of the individual elements, with which, as in the previous examples, the direction of information shift is established as a result of the geometrical shape of the individual magnetic film elements or the conductors for generating the necessary additional controlling fields or the composition of the elements which alters locally. The following description of an example makes use of domain wall movement.

Figure 17:
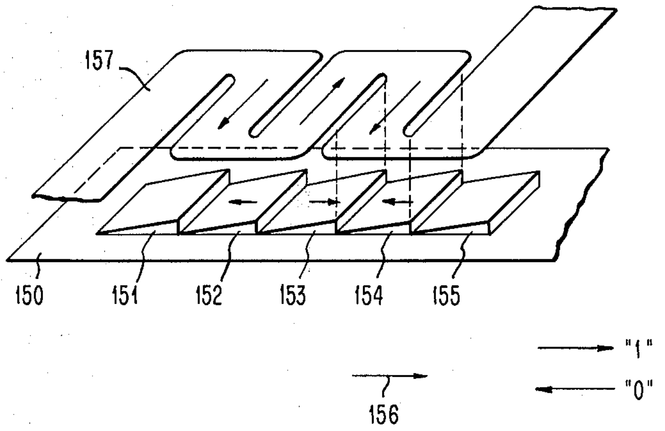
FIG. 17 shows a further shift register having a single conductor for generating the controlling magnetic fields.
Figure 18:
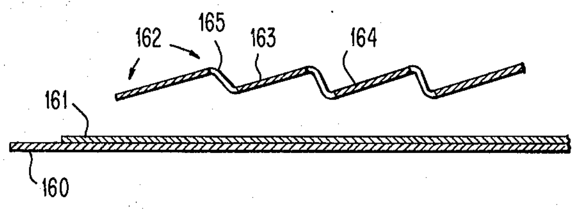
FIG. 18 shows a section through shift register corresponding to FIG. 17 but with magnetic elements of equal thickness and with inclined conductors, along the section lines XVIII—XVIII in FIG. 19.
Figure 19:
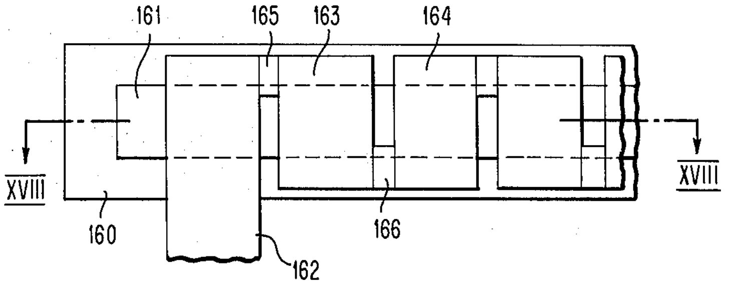
FIG. 19 is a plan view of the shift register shown in FIG. 18.

In the example of FIG. 17 the magnetic elements 151–155 are evaporated on a substrate 150; these elements having a uniaxial preferred magnetic direction corresponding to the arrow 156. The individual magnetic elements 151–155 must be in bodily contact with each other, so that a domain wall movement can be transferred from one element to the next element.

On top of the elements 151–155 is located a conductor 157, of copper, for instance and evaporated on the magnetic units. The conductor 157 is meandershaped, whereby a strip located diagonally to the direction of the arrow 156 is allotted to each of the elements 151–155. When a current flows through conductor 157 a magnetic field is produced which influences the individual elements 151–155 in the easy direction and whereby the fields influencing two neighboring units are opposed as the result of the described geometrical form of conductor 157. The direction of information shift which occurs is also indicated by arrow 156. The individual elements store the information "1" when the magnetization in the easy direction shows to the right and the information "0" when the magnetization shows to the left.

It is assumed for the sake of explaining the mode of operation that the element 153 stores the information "1" and the elements 152 and 154 the information "0," as the arrows indicate. The current in conductor 157, again as indicated by arrows, is opposed to the magnetization shown.

When the conditions which have been assumed, the magnetic field having effect on the thinnest part of the element 154 is composed on the one hand of the stray field of element 153 and the field of conductor 157. The two components add up and are of such direction as to oppose the magnetization of unit 154. As a result of the influence of this total field a domain wall motion takes place which shifts the domain wall between the directions of magnetization "1" and "0" to the right. It will thus be seen that, after the current has discontinued the information "1" has passed from element 153 to element 154.

In order to achieve the procedure stated it is necessary that the stray field $H_S$ present on the left-hand side of a magnetic film unit and the field $H_i$ produced by conductor 157 combined are greater than the field strength necessary for achieving wall motion and smaller than the nucleation field strength. On the other hand, the external field $H_i$ must be at least strong enough to achieve a wall motion.

It is assumed here that the coercive force is constant over the entire film.

As was the case with the first two examples the asymmetry of the individual elements can also be achieved by an asymmetry of the conductor, which generates the additional fields. An example with magnetic units having constant thickness and asymmetrically arranged conductors is shown, in section and plan view, in the FIGS. 18 and 19. The magnetic layer 161 is evaporated on the glass substrate 160. It is desired to mention here that with this embodiment it is not necessary for the film to be sub-divided into individual units in a physical sense; sub-division is achieved by the shape of the conductor designated here by 162.

The conductor 162 is meander-shaped in the manner described with reference to FIG. 17; whereby the individual strips, for instance 163 and 164, are arranged perpendicularly to the direction of information shift and are inclined to the direction of information shift so that the distance between the magnetic unit 161 and the strip 162 increases in the direction of information shift. Correspondingly the connecting pieces, for instance 165 and 166, located outside the magnetic units, must be inclined in the opposite direction.

As a result of the indicated conductor shape the field strength is greatest at the left-hand edge of the individual units, so that the domain wall motion commences here.

Figure 20:
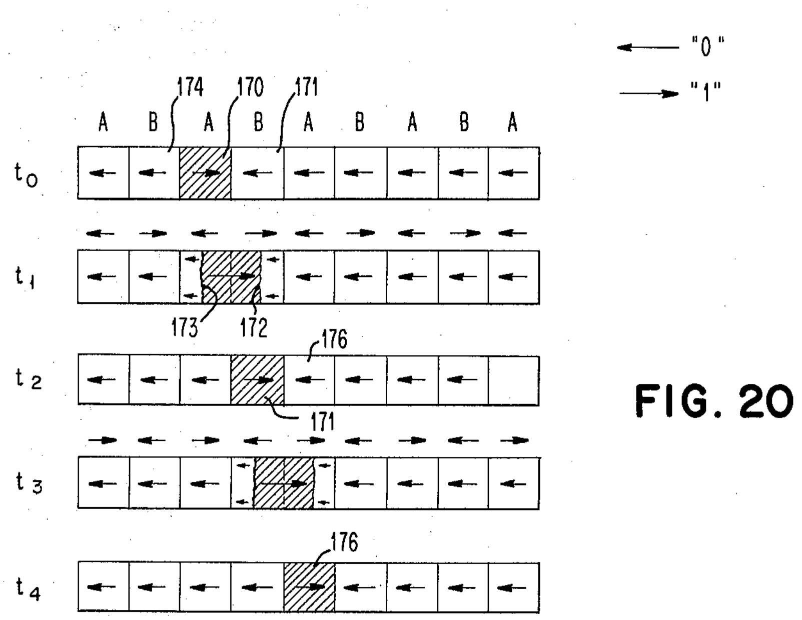
FIG. 20 is a graphical representation for explaining the transfer of information in the case of the shift register shown in FIG. 17.

With the aid of FIG. 20 it is now intended to explain once more the transfer of information. At the instant $t_0$ all the units with the exception of unit 170 are aligned according to the value corresponding to the information "0," while the unit 170 is magnetized in the easy direction, corresponding to the value "1." The current flowing through conductor 157 and 162 respectively is now arranged so that the field generated by this conductor is oriented to the left in the case of the A units and to the right in the case of the B units, as the arrows over the units at the instant $t_1$ show. The unit 171, which is located adjacent unit 170 in the direction of shift, is thus influenced on the one hand by the additional field, pointing to the right, which is produced by the conductor and by the stray field of the unit 170. With the assumed phase of the current through the conductor these two fields add up so that the right-hand domain wall of unit 172 start to move to the right. With increasing current the wall shifts up to the right-hand limiting line of unit 171.

The left hand domain wall 173 of unit 170 also moves to the right, since the external field and the field of the unit 174 which adjoins element 170 on the left summate and, as explained above, this is adequate for initiating a wall motion. At the instant $t_2$, that is after the current through the conductor discontinues, the information has moved from unit 170 to unit 171 or, in other words, the limiting walls of the domains oriented in the direction "1" have moved to the right until they coincide with the limiting lines of the unit 171.

In the following half wave of the current through conductor 157 and 162 respectively the external field reverses, that is the field appearing at the A units is pointing to the right, that field appearing at the B units is oriented to the left, again as indicated by the arrows over the units at the instant $t_3$. Thus, upon the unit 176, located on the right of unit 171, a field again exerts an influence; this field is composed of the external field and the stray field of unit 171. These two fields add up so that again a wall motion in the right-hand direction takes place in the manner explained in the case of the first half wave. After the second half wave has discontinued, that is at the instant $t_4$, the information "1" has thus moved from unit 170 to the unit 176. Thus, a full half wave of the current through the conductor is sufficient to achieve a transfer of information over two magnetic units.

The last-described devices also lend themselves for the accomplishment of logical operations, in the same manner described in connection with FIGS. 9–12.

Figure 21:
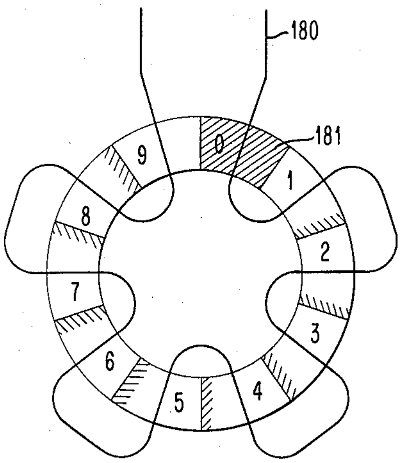
FIG. 21 is a counter device employing the magnetic elements shown in FIG. 17.

It is also possible to create a counter, as shown in FIG. 21. The individual units are arranged to form a ring, as shown, whereby each unit extends over 36°. Each unit or segment is allotted to one of the number 0–9. The additional field is produced by a conductor 180 which is arranged so that two adjacent units in the easy direction are exposed to magnetic fields of substantially opposite direction. The shaded element 181, is assumed to be oppositely magnetized than are the other nine units. If now an A.C. voltage is applied to conductor 180, the zone of magnetization, which is oriented oppositely moves about the ring with one unit per half wave. After five periods or ten half waves, the initial conditions are restored, that is a cycle has been completed. For taking off information, coils or similar equipment (not shown) are provided which supply an output signal, for example, during the traverse of information "1" through a predetermined unit or place in the ring, for instance, the partition between the regions 9 and 0.

The arrangements shown are characterized in that only two magnetic units are necessary for the transfer of bit information. The arrangements illustrated operate in accordance with the two-step or one-step system. Thus, by comparison with arrangements of this kind which have been employed so far which in order to prevent a backward flow of information, are only able to operate according to the three-step system, a considerable saving is achieved. It has been shown that the new arrangements allow of logical operations, also inversions and pulse counts, in a simple and reliable manner. The individual units are characterized in that their manufacture is simple and their phyhical height is very small.

While the invention has been particularly shown and described with reference to preferred embodiments thereof, it will be understood by those skilled in the art that various changes in form and details may be made therein without departing from the spirit and scope of the invention.

What is claimed is:

1. In an information transfer circuit, a first, a second and a third planar magnetic element, each said element having uniaxial anisotropy defining opposite stable states of remanent flux orientation along an easy axis of magnetization, each said element switchable from one stable state to another upon application of a first field applied transverse and a second field applied parallel with respect to the easy axis thereof where each said field is of predetermined magnitude, each said element made of ferromagnetic material having a predetermined height and width dimensions, said elements positioned in mutual field coupling relationship to one another so that each applies a parallel field with respect to the easy axis to each adjacent element, means including said second element for applying both a transverse and a parallel field to both said first and third elements tending to shift the information stable state of said second element to both said first and third elements, said means including a variation in one of the height and width dimensions of at least said second element in a desired direction of information shift whereby the magnitude of the parallel field therefrom varies and the state of said second element is established in only one of said first and third elements.

2. The circuit of claim 1, wherein the variation in one of said height and width dimensions of at least said second element increases the magnitude of the parallel field therefrom in the direction of information shift.

3. The circuit of claim 2, wherein each said element is positioned in the same plane with their respective easy axes in alignment.

4. An information transfer circuit comprising a plurality of planar magnetic thin film elements arranged in field coupling relationship to one another, each said element made of magnetic material and exhibiting uniaxial anistropy defining opposite stable states of remanent flux orientation along an easy axis of magnetization and a hard axis of magnetization displaced 90° from the easy axis, each said element having a predetermined height and width dimensions, one of the dimensions of each element varying in the direction of the easy axis whereby the static magnetic field emanating from a first extremity of an element is of lesser relative magnitude than the static magnetic field emanating from an opposite extremity thereof, said elements arranged so that the opposite extremity of each element is in proximity to the first extremity of the next succeeding element, each said element switchable from one stable state to another upon application of a first field applied transverse and a second field applied parallel with respect to the easy axis thereof where each said first and second field is of predetermined magnitude, and means for applying a transverse field to alternate ones of each elements in turn to momentarily rotate the magnetization of said alternate elements toward the hard direction and thereby shift the stable state of each element preceding said alternate elements to the next succeeding alternate elements only.

5. In a circuit, a plurality of planar magnetic elements each having uniaxial anisotropy defining opposite stable states of remanent flux orientation along an easy axis of magnetization, each said elements switchable from one stable state to another by application of a first field applied transverse and a second field applied parallel with respect to the easy axis thereof where each said first and second fields are of predetermined magnitude, said elements arranged in mutual field coupling relationship so that each element applies a field parallel to the easy axis of each adjacent element, a first and a second conductor each coupling different and alternate elements, and means including said conductors and said elements for applying a transverse and a parallel field to alternate ones of said plurality of elements, including means by which the effect of one of said transverse and parallel fields differs in a desired direction of information shift, the magnitude of one of said transverse and parallel fields differing in the direction of information shift, said elements comprising a continuous metallic magnetic material and said conductors being positioned over each element so that the distance therebetween varies in the direction of information shift whereby the magnitude of said first field increases in the direction of information shift.

6. In a circuit, a plurality of planar magnetic elements each having uniaxial anisotropy defining opposite stable states of remanent flux orientation along an easy axis of magnetization, each said elements switchable from one stable state to another by application of a first field applied transverse and a second field applied parallel with respect to the easy axis thereof where each said first and second fields are of predetermined magnitude, said elements arranged in mutual field coupling relationship so that each element applies a field parallel to the easy axis of each adjacent element, a first and a second conductor each coupling different and alternate elements, and means including said conductors and said elements for applying a transverse and a parallel field to alternate ones of said plurality of elements, including means by which the effect of one of said transverse and parallel fields differs in a desired direction of information shift, the magnitude of one of said transverse and parallel fields differing in the direction of information shift, each said element comprising a continuous film of different magnetic material so that the coercive force varies in the direction of information shift.

7. In an information transfer circuit, a first, a second and third planar magnetic element, each said element having uniaxial anisotropy defining opposite stable states of remanent flux orientation along an easy axis of magnetization, each said element switchable from one stable state to another upon application of a first field applied transverse and a second field applied parallel with respect to the easy axis thereof where each said field is of predetermined magnitude, said elements positioned in mutual field coupling relationship so that each element applies a parallel field with respect to the easy axis of each adjacent element, means including said second element for applying both a transverse and a parallel field to both said first and third elements tending to shift the information stable state of said second element to both said first and third elements, said means including means by which the effect of one of said transverse and parallel fields differs in a desired direction of information shift whereby the state of said second element is established in only one of said first and third elements, the magnitude of one of said transverse and parallel fields differing in the direction of information shift, said means for applying said transverse field to both said first and third elements comprising a conductor positioned above both said first and third elements so that the distance between the conductor and each of said elements varies in the direction of information shift.

References Cited by the Examiner

UNITED STATES PATENTS

| | | | |
|---|---|---|---|
| 2,919,432 | 12/1959 | Broadbent | 340—174 |
| 3,068,453 | 12/1962 | Broadbent | 340—174 |

OTHER REFERENCES

Page 54, November 1960, Publication I, "Magnetic Steeror," by P. E. Stuckert, IBM Technical Disclosure Bulletin, vol. 3, No. 6.

IRVING L. SRAGOW, *Primary Examiner.*

J. W. MOFFITT, J. P. SCHERLACHER, *Assistant Examiners.*